United States Patent
Prengaman et al.

(10) Patent No.: US 7,923,155 B2
(45) Date of Patent: Apr. 12, 2011

(54) LEAD-TIN-SILVER-BISMUTH CONTAINING ALLOY FOR POSITIVE GRID OF LEAD ACID BATTERIES

(75) Inventors: David R. Prengaman, Arlington, TX (US); Frank A. Fleming, Ozark, MO (US)

(73) Assignees: Northstar Battery Company, LLC, Springfield, MO (US); RSR Technologies, Dallas, TX (US)

( * ) Notice: Subject to any disclaimer, the term of this patent is extended or adjusted under 35 U.S.C. 154(b) by 78 days.

(21) Appl. No.: 12/049,700

(22) Filed: Mar. 17, 2008

(65) Prior Publication Data

US 2008/0233482 A1 Sep. 25, 2008

Related U.S. Application Data

(60) Provisional application No. 60/895,885, filed on Mar. 20, 2007.

(51) Int. Cl.
*H01M 4/68* (2006.01)
*C22C 11/00* (2006.01)
*C22C 11/06* (2006.01)

(52) U.S. Cl. ........ 429/245; 429/233; 420/565; 420/566; 420/570

(58) Field of Classification Search .......... 429/122–255; 420/562–575
See application file for complete search history.

(56) References Cited

U.S. PATENT DOCUMENTS

| | | | |
|---|---|---|---|
| 3,309,228 A * | 3/1967 | Dodson et al. | 429/204 |
| 5,298,350 A | 3/1994 | Rao | |
| 5,434,025 A | 7/1995 | Rao et al. | |
| 5,691,087 A | 11/1997 | Rao et al. | |
| 5,834,141 A | 11/1998 | Anderson et al. | |
| 5,874,186 A | 2/1999 | Rao et al. | |
| 2003/0017399 A1 * | 1/2003 | Zhang et al. | 429/245 |
| 2004/0033157 A1 * | 2/2004 | Schaeffer | 420/565 |
| 2004/0110067 A1 | 6/2004 | Taylor | |

FOREIGN PATENT DOCUMENTS

| | | | |
|---|---|---|---|
| DE | 2758940 | | 7/1979 |
| DE | 3045683 A1 | | 6/1982 |
| EP | 0051897 | * | 5/1982 |
| JP | 09283137 A | * | 10/1997 |

OTHER PUBLICATIONS

Machine Translation of EP 0051897.*
Machine Translation of JP 09-283137 (Oct. 1997).*
Machine Translation of EP 0051897 (May 1982).*
Prengaman, D.; "Wrought Lead Calcium Tin Alloys for Tubular Lead-acid Battery Grids" Journal of Power Sources; 1995; pp. 207-214; vol. 53.
International Search Report and Written Opinion of the International Searching Authority from corresponding PCT/US2008/057410.
Prengaman, R. David, Challenges from corrosion-resistant grid alloys in lead acid battery manufacturing, Journal of Power Sources, 2001, pp. 224-233, vol. 95.
Fouache, S. et al., Effect of calcium, tin and silver contents in the positive grids of automotive batteries with respect to the grid manufacturing process, Journal of Power Sources, 1999, pp. 12-22, vol. 78.
Bouirden, L. et al., Discontinuous and continuous hardening processes in calcium and calcium-tin micro-alloyed lead: influence of 'secondary-lead' impurities, Journal of Power Sources, 1991, pp. 27-50, vol. 33.
English Translation of German Patent No. DE 30 45 683 A1, Published Sep. 6, 1982, 3 pages.

* cited by examiner

*Primary Examiner* — Basia Ridley
*Assistant Examiner* — Jacob Buchanan
(74) *Attorney, Agent, or Firm* — Thompson Coburn LLP

(57) ABSTRACT

A lead-acid battery grid made from a lead-based alloy containing, in addition to lead, tin at a concentration that is at least about 0.500%, silver at a concentration that is greater than 0.006%, and bismuth at a concentration that is at least about 0.005%, and, if calcium is present in the lead-based alloy, the calcium is at concentration that is no greater than about 0.010%.

20 Claims, No Drawings

LEAD-TIN-SILVER-BISMUTH CONTAINING ALLOY FOR POSITIVE GRID OF LEAD ACID BATTERIES

BACKGROUND OF THE INVENTION

1. Field of the Invention

The invention relates to an alloy that comprises lead, tin, silver, and bismuth for use in the positive grids of lead-acid batteries. In particular, the alloy of the present invention may be used to form thin grids by any method, including expanded metal processing and book mold casting. The alloys of the present invention may provide one or more of the following properties: grids may be formed without resort to extraordinary measures, harden relatively rapidly, relatively stable (i.e., enable a battery containing them to provide relatively long term service), and relatively easy recycleability.

2. Description of Related Technology

Modern storage batteries require a relatively large numbers of grids, which requires that the grids be particularly thin. These high performance batteries allow for relatively high voltages, amperages, rapid recharge, or a combination thereof, which makes them particularly useful for automobile starting batteries, full electric and hybrid electric vehicles, and stationary batteries for uninterruptible power service or telecommunications service.

Production of thin grids whether conventional book mold cast, continuously cast, continuously cast strip followed by expansion or direct continuous cast followed by rolling, typically entails handling the grid or the strip at relatively high temperatures. The thinner the grid or strip, the more difficult it is to handle the grid or strip at such temperatures. Typical production processes rapidly decrease the temperature of the grid or strip with air cooling, water cooling, or water-cooled trim dies and platens depending on the process. The enhanced reduction in temperature has been used for lead-calcium alloy grids because they tend to be weak at elevated temperatures and a rapid reduction in temperature tends to counter deformations or thickness changes due to inadequate hardness. Despite rapid cooling to room temperature, many grid materials produced from low calcium, lead-based alloys tend to be difficult to handle due to inadequate hardness even at room temperature.

In addition to hardness, the physical dimensions of grids/strips also affect the amount of handling/processing a grid/strip is able to acceptably withstand. In general, grids having a thickness of at least 0.060 inches (1.524 mm) typically have enough mass so that they are better able to withstand handling/processing despite having low mechanical properties. Thus, such "thick" grids typically may be cooled to room temperature more slowly than grids having a thickness that is less than 0.060 inches (1.524 mm) (i.e., "thin" grids). Also, thick grids typically withstand the handling associated with pasting more readily than thin grids.

Certain mechanical properties of lead-calcium grid alloys depend, not only on temperature, but also on aging. Specifically, after being reduced to room temperature, the hardness of such alloys tends to be greater after a period of time has lapsed than when it initially reached room temperature.

Lead-calcium-based alloys largely replaced lead-antimony-based alloys as the materials of choice for positive grids of both automobile and stationary lead-acid batteries for a variety of reasons. Lead-antimony alloys were replaced primarily because they tend to corrode more rapidly than lead-calcium alloys. This corrosion is detrimental because it tends to result in the release of antimony, which during a recharge process, tends to migrate to the negative plate where it causes a loss of water from the electrolyte, particularly when exposed to relatively hot environments. In contrast, lead-calcium alloys tend to be significantly resistant to water loss during service and, as a result, they are widely used to make grids for "maintenance-free" or sealed lead-acid (SLA) batteries.

Lead-calcium alloys have also be widely utilized because they typically have a very low freezing range and are capable of being processed into positive and negative grids by a variety of grid manufacturing processes, such as conventional book mold casting, rolling and expanding, continuously casting followed by expansion or punching, continuous grid casting, and continuous grid casting followed by rolling. Continuous grid manufacturing processes are particularly desirable because they typically decrease production costs associated with battery grid and plate production.

The early lead-calcium alloys typically contained a relatively high calcium content (e.g., 0.08% or higher) and relatively low tin content (e.g., 0.35-0.5%). Advantageously, positive grids produced from these alloys hardened rapidly and could be handled and pasted into plates easily. Specifically, these alloys, because of the high calcium content, tend to form $Pb_3Ca$ precipitates over $Sn_3Ca$ precipitates and, although the $Pb_3Ca$ precipitates tends to harden the alloy, they tend to result in increased corrosion and growth of positive grids in high temperature applications (e.g., newer, more aerodynamic automobiles with less cooling of the battery by flowing air). To address this problem, lead-calcium alloys were developed that contain lower calcium concentrations and other metals added to the alloy (e.g., U.S. Pat. Nos. 5,298,350; 5,434,025; 5,691,087; 5,834,141; 5,874,186; as well as DE 2,758,940). The grids produced from these alloys, however, are not without problems. The very low calcium contents (0.02-0.05%) generally utilized in the grid alloys produce grids which are very soft, difficult to handle, and harden very slowly. To utilize grids produced from these alloys, the cast material is usually stored at room temperature for long periods of time or artificially aged at elevated temperatures to bring the material to sufficiently high mechanical properties to be handled in a pasting or expander/paster machine.

Low-calcium alloys typically also contain tin at a relatively low amount and silver at a relatively high amount and these alloys tend to be very corrosion-resistant. Nevertheless, in addition to the above-described handling issue, these alloys also usually require special procedures in order to be made into a battery plate. Specifically, a grid is typically pasted with a mixture of leady lead oxide, sulfuric acid, water and some additives. After pasting, the plates are cured to permit the paste (active material of the battery) to firmly adhere to the battery grid so that there is sufficient electrical contact between the grid and the active material. Unfortunately, to cure the plates, the grids must be corroded so that the paste adheres to the grid, which requires manufacturers to resort to significant effort and cost to corrode the corrosion-resistant grids. Examples of such efforts include treating the grids for long periods of time in hot steam environments to produce a corrosion film on the grid surface; treating the surface of the grids with alkaline reagents, peroxides, or persulfates; and long curing times at high temperature and humidity for as long as five days. Despite these efforts, the most common failure mechanism of batteries using such alloys is the disengagement of active material disengagement from the positive grid, not positive grid corrosion.

Such low Ca-low Sn-high Ag lead-based alloys have yet another problem that is due principally to the relatively low tin content (e.g., 0.3-0.6%). Specifically, the low tin contents permit the formation of non-conductive oxide layers between the grid and active material when the battery becomes discharged. The electrical resistance of these oxide products may prevent adequate charge acceptance during recharge of the battery if it becomes discharged, thus resulting in premature failure.

In view of the foregoing, a need exists for lead-based alloys for use in the production of grids for lead-acid batteries, in general, and positive grids, in particular, and having one or more of the following characteristics, abilities, and/or uses: resistance to corrosion at relatively high temperatures such as those found in automobile engine compartments; capable of being used to produce thin grids by any method desired (e.g., continuously cast-expansion or punched, roll-expansion, continuously cast, continuously cast-rolled, or conventional book mold casting); hardens relatively rapidly so that the grid may be utilized in the production of battery plates within a relatively short period of time after production; that may be used without excessively long aging periods or without resorting to artificial aging; certain pastes adhere to the grid surface without curing; resistance to formation of non-conductive oxide layers between the grid and active material when a battery containing the grid is discharged; a degree of creep resistance and mechanical properties that allow the battery grid to resist the effects of elevated temperatures; and a grain structure stability resulting in reduced corrosion and the improved retention of the mechanical properties and active material at elevated temperatures.

BRIEF SUMMARY OF THE INVENTION

The present invention is directed to a battery grid comprising a lead-based alloy comprising lead, tin at a concentration that is at least about 0.500%, silver at a concentration that is greater than 0.006%, and bismuth at a concentration that is at least about 0.005%, and, if calcium is present in the lead-based alloy, the calcium is at concentration that is no greater than about 0.010%.

Additionally, the present invention is directed to a battery positive grid consisting essentially of a continuously cast lead-based alloy that consists essentially of lead, tin at a concentration that is at least about 0.900% and no greater than about 1.100%, silver is at a concentration that is at least about 0.018% and no greater than 0.022%, and bismuth is at a concentration that is at least about 0.015% and no greater than about 0.020%.

The present invention is also directed to lead-acid battery comprising a container and, within the container, at least one positive plate, at least one negative plate, and at least one separator separating each positive and negative plates, wherein the positive plate comprises a battery grid having a surface and an active material adhered to at least a portion of the battery grid surface, wherein the battery grid comprises a lead-based alloy that comprises lead and tin at a concentration that is at least about 0.500%, silver at a concentration that is greater than 0.006%, and bismuth at a concentration that is at least about 0.005%, and, if calcium is present in the lead-based alloy, the calcium is at concentration that is no greater than about 0.010%.

Further, the present invention is directed to a lead-acid battery comprising a container and, within the container, at least one positive plate, at least one negative plate, and at least one separator separating each positive and negative plates, wherein the positive plate comprises a battery grid having a surface and an active material adhered to at least a portion of the battery grid surface, wherein the battery grid consists essentially of a continuously cast alloy that consists essentially of lead, tin, silver, and bismuth, wherein the tin is at a concentration that is at least about 0.900% and no greater than about 1.100%, the silver is at a concentration that is at least about 0.018% and no greater than 0.022%, the bismuth is at a concentration that is at least about 0.015% and no greater than about 0.020%.

DETAILED DESCRIPTION OF THE INVENTION

The present invention, among other things, is directed to a battery grid that is particularly useful as a positive grid, wherein at least a portion of and preferably the entirety of said grid comprises a lead-based alloy that comprises a lead, tin, silver, and bismuth. The grids of the present invention are particularly useful for producing lead-acid batteries. Such a battery comprises, among other things, a container and, within the container, at least one positive plate, at least one negative plate, and at least one separator separating each positive and negative plates, wherein the positive plate comprises a battery grid having a surface and an active material adhered to at least a portion of the battery grid surface, wherein the battery grid comprises the aforementioned lead-based alloy. Such batteries may be configured for essentially any end application such as starting-lighting and ignition (automobile) batteries, full electric and hybrid electric vehicles, and stationary batteries for uninterruptible power service or telecommunications service. The separator(s) may be, for example, gel, absorbed glass mat (AGM), granular silica, high silica glass, or polymeric.

Experimental results to date suggest that the lead-based alloys of the present invention preferably consist essentially of lead, tin, silver, and bismuth. More specifically, the results to date suggest that battery grids, in particular those used as a positive grid, that contain lead, tin, silver, and bismuth and no more than 0.010% (100 ppm) of all other elements combined are readily formed and incorporated into essentially any lead-acid battery design and allow such batteries to operate more effectively or longer when subjected to extreme service conditions. In addition to the foregoing total of all other elements, it should be noted that of that foregoing total of 0.010% for all other elements it is typically preferred that each other element be at what is considered to be a "trace amount," which is typically considered to be an amount no greater than about 0.001% (10 ppm). Examples of typical trace elements include antimony, arsenic, cadmium, iron, nickel, selenium, tellurium, and zinc.

It is to be noted that all references to constituent percentages herein are to weight percentages. The amounts may also be disclosed in parts per million. Additionally, the alloy compositions of the present invention are the overall stoichiometries or bulk stoichiometries prior to being subject to use in a battery. That is, a disclosed alloy composition is an average stoichiometry over the entire volume of a prepared alloy and, therefore, localized stoichiometric variations may exist.

In particular, it has been discovered that alloy compositions of the present invention are capable of forming thin grids having a thickness no greater than about 0.060 inches (no greater than about 1.5 mm) by any appropriate method (e.g., continuously cast-expansion or punched, roll-expansion, continuously cast, continuously cast-rolled, or conventional book mold casting); harden relatively rapidly so that the gird may be utilized in the production of battery plates within a relatively short period of time after being produced; are capable of being used without excessively long aging periods or without resorting to artificial aging; certain pastes adhere to its surface (formed as a grid) without curing; resistant to the formation of non-conductive oxide layers between the grid and active material when a battery containing the grid is discharged; are resistant to corrosion, when in a battery, at relatively high temperatures such as those found in automobile engine compartments; have a degree of creep resistance and mechanical properties that allow the battery grid resist the effects of elevated temperatures; and/or have a grain structure stability resulting in reduced corrosion and the improved retention of the mechanical properties and active material at elevated temperatures.

The lead-based alloy compositions of the present invention contain amounts of tin, silver, and bismuth that are sufficient for the metals to play a role in the performance of the ability of the alloy as a grid alloy, in general, and as a positive grid alloy, in particular, and/or crystallographic structure of the alloy. Stated another way, the amounts of tin, silver, and bismuth in the lead-based alloy are such that the metals would not be considered an impurity or a trace amount. It should be noted that what is considered to be an impurity amount of tin, silver, and/or bismuth in lead varies significantly based on the source of the lead. Regardless, it is preferred that the concentration of tin be at least about 0.500% and the concentration of silver be at greater than 0.006% (60 parts per million). Additionally, it is preferred for the concentration of bismuth to be at least about 0.005% (50 ppm).

Lead

The alloy of the present invention is lead-based and, therefore, its primary constituent is lead. Specifically, the alloy compositions of the present invention comprise at least about 95% lead. Typically, the alloys comprise at least about 98% lead, especially in the alloy compositions that consist essentially of lead, tin, silver, and bismuth.

Tin

The alloy compositions of the present invention typically comprise tin at a concentration that is at least about 0.500% and no greater than about 2.000%. The experimental results to date indicate that alloys having particularly desirable hardening characteristics are achieved by controlling the tin concentration, in combination with the other constituents, so that it is at least about 0.700% and no greater than about 1.500% and preferably at a concentration that is at least about 0.900% and no greater than about 1.200%. In fact, it is believed that the improved mechanical properties, such as the increased hardening rate and yield strength, are due primarily to the presence of the tin at the foregoing concentrations.

In addition to the mechanical properties, it is believed that the presence of tin in the alloy compositions of the present invention provide other benefits that warrant its inclusion despite being relatively costly. That said, the rate of return for increasing the concentration of tin above of about 1.500% does not typically justify the added cost for conventional commercial applications. Without being held to a particular theory, it is believed that one such additional benefit of tin at the aforementioned concentrations is that it tends to reduce the rate of corrosion that forms the corrosion product layer between the grid alloy and the active material when the battery becomes discharged. This, in turn, is believed to result in the corrosion product layer being thinner, which aids in recharge. Further, the presence of tin in the form of $SnO_2$ in the corrosion product layer tends to decrease the relative amount of insulating layer thereby resulting in reduced passivation.

It is also believed that some of the tin near the surface of the alloy migrates to and dopes the positive active material, which allows for a more complete recovery from deep discharge. Specifically, it is believed that the addition of the tin helps to reduce the production of $PbSO_4$ or tetragonal PbO at the grid/active material interface when deeply discharged. These products can act as insulators that inhibit recharge except at very high potentials, which are not typically produced by automobile alternators.

It is important to note that, unlike in Pb—Ca alloys, the presence of tin in the alloys of the present invention is not believed to enhance resistance to penetrating corrosion of the grid. Specifically, its is believed that the tin in Pb—Sn alloys modifies the interfacial barrier and produces large grain structures in the alloy that tend to make the alloy more prone to penetrating corrosion along the grain boundaries, which corrodes preferentially, especially when exposed to high service temperatures. In contrast, it is known that adding tin to high-Ca Pb—Ca alloys (e.g., 0.06-0.08% Ca) such that the tin concentration is about 1% results in high-Ca alloys having similar or lower corrosion rates in acid media than low-Ca alloys. See, e.g., Prengaman, The Metallurgy and Performance of Cast and Rolled Lead Alloys for Battery Grids, Journal of Power Sources, 67 (1997) 267-278.

Silver

The penetrating corrosion problem associated with the presence of tin at the aforementioned concentrations is countered in the alloy compositions of the present invention, in large part, by the presence of silver. The concentrations of silver in the alloy associated with a reduction in penetrating corrosion rate may be as low as about 0.005% (50 ppm) but typically is at least about 0.010% (100 ppm) and preferably is at least about 0.015% (150 ppm). The presence of silver at these concentrations is, to a certain extent, surprising and contrary to the experience and understanding of those of ordinary skill in the art. Specifically, it is generally believed by others that the presence of silver in Pb—Ca—Sn—Ag rolled and conventionally cast alloys to form positive grids actually enhanced the failure of batteries in which they were used. Specifically, it was believed that the enhanced failure was due silver migrating to the negative plate of a battery and result in gassing. Without being held to a particular theory, it is believed by the present inventor that the gassing believed by others to be caused by silver in Pb—Ca—Sn—Ag alloys is actually the consequence of other deleterious impurities such as selenium, tellurium, manganese, cobalt, nickel, antimony, chromium, and/or iron from the grid or the active material (Investigation Report ET/IR526R, ALABC Project N 3.1, Influence of Residual Elements in Lead on the Oxygen- and/or Hydrogen-Gassing Rates of Lead-Acid Batteries, June 2002. In view of the foregoing and other teachings in the art, silver is generally considered by those of skill in the art to be a particularly unwanted impurity.

Although the presence of a certain minimum amount of silver in the alloy compositions of the present invention is effective at reducing penetrating corrosion and thereby premature battery failure, there typically is a maximum amount of silver due to a variety of concerns. The first is the relatively high cost of silver. Second, as the concentration of silver is increased, the lead, tin, and silver tend to form a relatively low melting point ternary eutectic material that makes casting difficult and can even cause cracking of continuously cast strip. Third, too much silver can make the grid too resistant to corrosion thereby necessitating extraordinary measures to cause the corrosion needed to "cure" or bond to a positive grid certain active material pastes. Although it may be possible for the alloys of the present invention to contain relatively high amounts of silver (e.g., up to 1.200%), this is typically not necessary and usually not preferred in view of the foregoing concerns. Rather, it has been discovered that the concentration of silver in the alloys of the present invention is typically no greater than about 0.050% (500 ppm). Preferably, the concentration of silver is no greater than about 0.030% (300 ppm) and more preferably no greater than about 0.025% (250 ppm). Therefore, it typical for the concentration silver to be at least about 0.005% (50 ppm) and no greater than about 0.050% (500 ppm), preferably at least about 0.010% (100 ppm) and no greater than about 0.030% (300 ppm), and more preferably at least about 0.015% (150 ppm) and no greater than about 0.025% (250 ppm).

The presence of silver at the foregoing concentrations is also believed to provide enhanced creep resistance to the alloys of the present invention, which among other things, allows for the active material to adhere better to the surface of a grid. Specifically, it is believed that the silver results in solid solution strengthening in which the silver tends to segregate at grain boundaries, especially in the presence of tin, and precipitates at dendritic areas.

Bismuth

The alloy compositions of the present invention typically comprise bismuth at a concentration that is at least about 0.005% (50 ppm) and no greater than about 0.050% (500 ppm). The experimental results to date indicate that alloys having particularly desirable hardening and strength characteristics are achieved by controlling the bismuth concentration, in combination with the other constituents, so that it is least about 0.010% (100 ppm) and no greater than about 0.030% (300 ppm) and preferably at a concentration that is at least about 0.015% (150 ppm) and no greater than about 0.025% (250 ppm).

As mentioned above, it is believed that the mechanical properties such as the increased hardening rate and yield strength are due primarily to the presence of the tin, but experimental results to date indicate that the presence of bismuth at the foregoing concentrations also plays a significant role in the mechanical properties. Without being bound to a particular theory, it is believed that the small but significant increase in strength provided by the presence of the bismuth is due to the fact that the bismuth is quite soluble in lead and relatively non-reactive with tin and silver, which allows for the bismuth to largely remain in the solid solution. Because the bismuth atoms are somewhat larger than the lead atoms, the lead lattice is slightly stretched, which enhances the strength of the alloy. Advantageously, it is also believed that the bismuth also aids in the casting and handling of the alloy by helping it "age" more quickly (i.e., it tends to increase the speed at which the strength of the alloy, after being cast, for handling and processing).

Calcium

In order to avoid the above-described problems or complications that are associated with the presence of calcium in battery grid alloy, the lead-based alloy compositions of the present invention contain at most an inconsequential amount of calcium (i.e., not enough calcium to form $Pb_3Ca$ precipitates and $Sn_3Ca$ precipitates because both types of precipitates tend to increase the rate of corrosion. See, e.g., D. Prengaman, Wrought Lead Calcium Tin Alloys for Tubular Lead-acid Battery Grids, Journal of Power Sources, Vol. 53, 1995, pp 207-214, including Tables 2 and 3, which show the corrosion rate increases as the calcium concentration increases. For example, the concentration of calcium is typically less than about 0.010% (100 ppm) and preferably less than about 0.005% (50 ppm). More preferably, the alloys of the present invention are essentially free of calcium (e.g., contains no more calcium than what is considered to be an impurity level such as about 0.001% (10 ppm)).

Additional Alloy Constituents

The lead-based alloy compositions of the present invention may comprise further elements at concentrations above the impurity or trace level. For example, cadmium and/or zinc may be included because these elements have a tendency to reduce gassing. Aluminum may be included because it has a tendency to act as a grain refiner. Additionally, barium may be included because it is believed that it may decrease penetrating corrosion.

EXAMPLES

An investigation into the aging behavior of battery grid alloys falling within the nominal compositional ranges of 0.005-0.025% silver, 0.015-0.025% bismuth, less than 0.1 to 1.25% tin, and lead making up the difference (except for allowable impurities, which did not exceed, in total, 0.010% (100 ppm) was performed. In this experiment, four silver concentrations, three bismuth concentrations, and three tin concentrations were investigated as mixed alloys. To minimize the total number of experiments from the 36 required for a full factorial analysis, a Taguchi design was developed using JMP6. Table A, below, provides the exact nominal compositions tested.

TABLE A

| Alloy # | Ag (wt %) | Bi (wt %) | Sn (wt %) |
|---|---|---|---|
| 1 | 0.025 | 0.020 | 0.1> |
| 2 | 0.015 | 0.025 | 0.1> |
| 3 | 0.015 | 0.015 | 1.0 |
| 4 | 0.015 | 0.020 | 1.0 |
| 5 | 0.015 | 0.020 | 1.2 |
| 6 | 0.025 | 0.015 | 1.2 |
| 7 | 0.025 | 0.025 | 1.0 |
| 8 | 0.005 | 0.015 | 0.1> |
| 9 | 0.005 | 0.015 | 0.1> |
| 10 | 0.005 | 0.025 | 1.2 |

For each alloy composition, 25 lbs of alloy were cast into six plates each measuring about 5"×5"×0.25" and three of the plates were water-quenched and the other three plates were air-cooled.

The actual alloy compositions, as determined my emission spectrograph, are set forth in Table B, below.

TABLE B

| Alloy # | Ag (wt %) | Bi (wt %) | Sn (wt %) |
|---|---|---|---|
| 1 | 0.0252 | 0.0272 | 0.0832 |
| 2 | 0.0131 | 0.0317 | 0.0812 |
| 3 | 0.0125 | 0.0159 | 0.9805 |
| 4 | 0.0123 | 0.0260 | 1.0169 |
| 5 | 0.0107 | 0.0256 | 1.1797 |
| 6 | 0.0174 | 0.0215 | 1.1836 |
| 7 | 0.0176 | 0.0287 | 0.9949 |
| 8 | 0.0051 | 0.0161 | 0.0777 |
| 9 | 0.0050 | 0.0163 | 0.0807 |
| 10 | 0.0053 | 0.0309 | 1.2319 |

The age hardening characteristics of each alloy composition was evaluated by performing hardness testing at approximately 1, 2, 24, 48, 168, 336 and 720 hours after casting at ambient conditions (about 72° F.) on each plate. The results of the aging study for each composition is shown in the tables set forth below.

| Time (hours) | Sample A | Sample B | Sample C | Average | Std. Dev. |
|---|---|---|---|---|---|
| \multicolumn{6}{c}{Hardness (Rockwell R)} | | | | | |
| \multicolumn{6}{c}{ALLOY #1 - AIR COOLED} | | | | | |
| 1 | −25 | | | −25.00 | — |
| 2 | −20 | | | −20.00 | — |
| 24 | 3 | 13 | −8 | 2.67 | 10.50 |
| 48 | 4 | 10 | 7 | 7.00 | 3.00 |
| 168 | 9 | 14 | 6 | 9.67 | 4.04 |
| 336 | 7 | 12 | 8 | 9.00 | 2.65 |
| 720 | 5 | 8 | 9 | 7.33 | 2.08 |
| \multicolumn{6}{c}{ALLOY #1 - WATER QUENCHED} | | | | | |
| 1 | 14 | 18 | 18 | 16.67 | 2.31 |
| 2 | 21 | 19 | 18 | 19.33 | 1.53 |
| 24 | 27 | 29 | 31 | 29.00 | 2.00 |
| 48 | 23 | 31 | 22 | 25.33 | 4.93 |
| 168 | 24 | 32 | 30 | 28.67 | 4.16 |
| 336 | 13 | 22 | 13 | 16.00 | 5.20 |
| 720 | 22 | 20 | 17 | 19.67 | 2.52 |

| Time (hours) | Sample A | Sample B | Sample C | Average | Std Dev. |
|---|---|---|---|---|---|
| \multicolumn{6}{c}{Hardness (Rockwell R)} | | | | | |
| \multicolumn{6}{c}{ALLOY #4 - AIR COOLED} | | | | | |
| 1 | −20 | | | −20.00 | — |
| 2 | −5 | −3 | | −4.00 | 1.41 |
| 24 | 3 | 8 | 0 | 3.67 | 4.04 |
| 48 | 3 | 9 | 10 | 7.33 | 3.79 |
| 168 | 8 | 8 | 7 | 7.67 | 0.58 |
| 336 | 3 | 4 | 15 | 7.33 | 6.66 |
| 720 | −1 | 0 | 4 | 1.00 | 2.65 |
| \multicolumn{6}{c}{ALLOY #4 - WATER QUENCHED} | | | | | |
| 1 | −15 | | | −15.00 | — |
| 2 | 1 | 4 | 2 | 2.33 | 1.53 |
| 24 | 22 | 18 | 22 | 20.67 | 2.31 |
| 48 | 21 | 22 | 29 | 24.00 | 4.36 |
| 168 | 18 | 16 | 15 | 16.33 | 1.53 |
| 336 | 20 | 17 | 20 | 19.00 | 1.73 |
| 720 | 14 | 25 | 20 | 19.67 | 5.51 |

| Time (hours) | Sample A | Sample B | Sample C | Average | Std Dev. |
|---|---|---|---|---|---|
| \multicolumn{6}{c}{Hardness (Rockwell R)} | | | | | |
| \multicolumn{6}{c}{ALLOY #2 - AIR COOLED} | | | | | |
| 1 | −50 | −50 | −50 | −50.00 | 0.00 |
| 2 | −50 | −50 | −50 | −50.00 | 0.00 |
| 24 | −50 | −50 | −50 | −50.00 | 0.00 |
| 48 | −50 | −50 | −50 | −50.00 | 0.00 |
| 168 | −15 | −12 | −15 | −14.00 | 1.73 |
| 336 | −14 | −14 | −9 | −12.33 | 2.89 |
| 720 | −17 | −21 | −7 | −15.00 | 7.21 |
| \multicolumn{6}{c}{ALLOY #2 - WATER QUENCHED} | | | | | |
| 1 | −50 | −50 | −50 | −50.00 | 0.00 |
| 2 | −50 | −50 | −50 | −50.00 | 0.00 |
| 24 | 1 | 13 | 8 | 7.33 | 6.03 |
| 48 | 7 | 13 | 6 | 8.67 | 3.79 |
| 168 | 12 | 12 | 8 | 10.67 | 2.31 |
| 336 | 3 | 12 | 8 | 7.67 | 4.51 |
| 720 | 10 | 4 | 4 | 6.00 | 3.46 |

| Time (hours) | Sample A | Sample B | Sample C | Average | Std Dev. |
|---|---|---|---|---|---|
| \multicolumn{6}{c}{Hardness (Rockwell R)} | | | | | |
| \multicolumn{6}{c}{ALLOY #5 - AIR COOLED} | | | | | |
| 1 | −5 | 1 | | −2.00 | 4.24 |
| 2 | 6 | −1 | 12 | 5.67 | 6.51 |
| 24 | 4 | 7 | 6 | 5.67 | 1.53 |
| 48 | 10 | 9 | 9 | 9.33 | 0.58 |
| 168 | 7 | 10 | 5 | 7.33 | 2.52 |
| 336 | 0 | 6 | 8 | 4.67 | 4.16 |
| 720 | 3 | 7 | 7 | 5.67 | 2.31 |
| \multicolumn{6}{c}{ALLOY #5 - WATER QUENCHED} | | | | | |
| 1 | −5 | | | −5.00 | — |
| 2 | 10 | 7 | 7 | 8.00 | 1.73 |
| 24 | 18 | 22 | 12 | 17.33 | 5.03 |
| 48 | 17 | 17 | 15 | 16.33 | 1.15 |
| 168 | 10 | 14 | 13 | 12.33 | 2.08 |
| 336 | 11 | 16 | 7 | 11.33 | 4.51 |
| 720 | 6 | 9 | 8 | 7.67 | 1.53 |

| Time (hours) | Sample A | Sample B | Sample C | Average | Std Dev. |
|---|---|---|---|---|---|
| \multicolumn{6}{c}{Hardness (Rockwell R)} | | | | | |
| \multicolumn{6}{c}{ALLOY #3 - AIR COOLED} | | | | | |
| 1 | −50 | −50 | −50 | −50.00 | 0.00 |
| 2 | −50 | −50 | −50 | −50.00 | 0.00 |
| 24 | −4 | −50 | −50 | −34.67 | 26.56 |
| 48 | −50 | −14 | −50 | −38.00 | 20.78 |
| 168 | −20 | −20 | −15 | 18.33 | 2.89 |
| 336 | −8 | −21 | −23 | −17.33 | 8.14 |
| 720 | −13 | −9 | −9 | −10.33 | 2.31 |
| \multicolumn{6}{c}{ALLOY #3 - WATER QUENCHED} | | | | | |
| 1 | −50 | −50 | −50 | −50.00 | 0.00 |
| 2 | 12 | 12 | 2 | 8.67 | 5.77 |
| 24 | 17 | 20 | 24 | 20.33 | 3.51 |
| 48 | 24 | 21 | 22 | 22.33 | 1.53 |
| 168 | 20 | 19 | 24 | 21.00 | 2.65 |
| 336 | 12 | 26 | 17 | 18.33 | 7.09 |
| 720 | 18 | 23 | 15 | 18.67 | 4.04 |

| Time (hours) | Sample A | Sample B | Sample C | Average | Std Dev. |
|---|---|---|---|---|---|
| \multicolumn{6}{c}{Hardness (Rockwell R)} | | | | | |
| \multicolumn{6}{c}{ALLOY #6 - AIR COOLED} | | | | | |
| 1 | −10 | | | −10.00 | — |
| 2 | 1 | 2 | −1 | 0.67 | 1.53 |
| 24 | 10 | 4 | 4 | 6.00 | 3.46 |
| 48 | 15 | 15 | 19 | 16.33 | 2.31 |
| 168 | 12 | 9 | 12 | 11.00 | 1.73 |
| 336 | 10 | 15 | 12 | 12.33 | 2.52 |
| 720 | 8 | 13 | 9 | 10.00 | 2.65 |
| \multicolumn{6}{c}{ALLOY #6 - WATER QUENCHED} | | | | | |
| 1 | 5 | 10 | 12 | 9.00 | 3.61 |
| 2 | 11 | 14 | 14 | 13.00 | 1.73 |
| 24 | 30 | 34 | 28 | 30.67 | 3.06 |
| 48 | 30 | 33 | 30 | 31.00 | 1.73 |
| 168 | 26 | 25 | 27 | 26.00 | 1.00 |
| 336 | 23 | 21 | 26 | 23.33 | 2.52 |
| 720 | 25 | 26 | 24 | 25.00 | 1.00 |

| Time (hours) | Sample A | Sample B | Sample C | Average | Std Dev. |
|---|---|---|---|---|---|
| ALLOY #7 - AIR COOLED | | | | | |
| 1 | −6 | | | −6.00 | — |
| 2 | −10 | 3 | 2 | −1.67 | 7.23 |
| 24 | 8 | 6 | 8 | 7.33 | 1.15 |
| 48 | 2 | 12 | 4 | 6.00 | 5.29 |
| 168 | 9 | 4 | 11 | 8.00 | 3.61 |
| 336 | 4 | 3 | 5 | 4.00 | 1.00 |
| 720 | −3 | 0 | 10 | 2.33 | 6.81 |
| ALLOY #7 - WATER QUENCHED | | | | | |
| 1 | 12 | 18 | 20 | 16.67 | 4.16 |
| 2 | 28 | 29 | 24 | 27.00 | 2.65 |
| 24 | 32 | 29 | 23 | 28.00 | 4.58 |
| 48 | 37 | 27 | 35 | 33.00 | 5.29 |
| 168 | 34 | 33 | 29 | 32.00 | 2.65 |
| 336 | 32 | 28 | 29 | 29.67 | 2.08 |
| 720 | 24 | 29 | 19 | 24.00 | 5.00 |

| Time (hours) | Sample A | Sample B | Sample C | Average | Std Dev. |
|---|---|---|---|---|---|
| ALLOY #8 - AIR COOLED | | | | | |
| 1 | −50 | | | −50.00 | — |
| 2 | −50 | | | −50.00 | — |
| 24 | −50 | | | −50.00 | — |
| 48 | −50 | | | −50.00 | — |
| 168 | −50 | | | −50.00 | — |
| 336 | −50 | | | −50.00 | — |
| 720 | −50 | | | −50.00 | — |
| ALLOY #8 - WATER QUENCHED | | | | | |
| 1 | −50 | | | −50.00 | — |
| 2 | −50 | | | −50.00 | — |
| 24 | −50 | | | −50.00 | — |
| 48 | −50 | | | −50.00 | — |
| 168 | −50 | | | −50.00 | — |
| 336 | −29 | −25 | | −27.00 | 2.83 |
| 720 | −50 | | | −50.00 | — |

| Time (hours) | Sample A | Sample B | Sample C | Average | Std Dev. |
|---|---|---|---|---|---|
| ALLOY #9 - AIR COOLED | | | | | |
| 1 | −50 | | | −50.00 | — |
| 2 | −50 | | | −50.00 | — |
| 24 | −50 | | | −50.00 | — |
| 48 | −50 | | | −50.00 | — |
| 168 | −50 | | | −50.00 | — |
| 336 | −50 | | | −50.00 | — |
| 720 | −50 | | | −50.00 | — |
| ALLOY #9 - WATER QUENCHED | | | | | |
| 1 | −50 | | | −50.00 | — |
| 2 | −50 | | | −50.00 | — |
| 24 | −50 | | | −50.00 | — |
| 48 | −50 | | | −50.00 | — |
| 168 | −35 | | | −35.00 | — |
| 336 | −24 | −25 | −30 | −26.33 | 3.21 |
| 720 | −24 | −34 | −38 | −32.00 | 7.21 |

| Time (hours) | Sample A | Sample B | Sample C | Average | Std Dev. |
|---|---|---|---|---|---|
| ALLOY #10 - AIR COOLED | | | | | |
| 1 | −30 | | | −30.00 | — |
| 2 | −15 | −15 | | −15.00 | 0.00 |
| 24 | −15 | −15 | −10 | −13.33 | 2.89 |
| 48 | −15 | −10 | −11 | −12.00 | 2.65 |
| 168 | −12 | −17 | −24 | −17.67 | 6.03 |
| 336 | −21 | −14 | −9 | −14.67 | 6.03 |
| 720 | −23 | −11 | −8 | −14.00 | 7.94 |
| ALLOY #10 - WATER QUENCHED | | | | | |
| 1 | −20 | | | −20.00 | — |
| 2 | −8 | 2 | −9 | −5.00 | 6.08 |
| 24 | 9 | 10 | 5 | 8.00 | 2.65 |
| 48 | 9 | 5 | 10 | 8.00 | 2.65 |
| 168 | 6 | 14 | 7 | 9.00 | 4.36 |
| 336 | 4 | 10 | 3 | 5.67 | 3.79 |
| 720 | 0 | 7 | 7 | 4.67 | 4.04 |

Advantageously, battery grids produced from the lead-tin-silver-bismuth-containing alloys of this invention are ready for pasting in as little as twelve hours, and certainly in 24 hours, compared to over seven days for certain conventional Pb—Ca and Pb—Ca—Sn alloys. Additionally, thin grids of the alloy can be easily handled due to the relatively high initial hardness of the Pb—Sn—Ag—Bi alloys of the present invention.

The alloys of the invention are workable in 24 hours, with the more preferred alloys workable in as little as two hours, especially if water-quenched. The alloys may be formed into battery grids by any conventional production method referred to in the prior art discussion, including book molding and continuous strip casting processes. The alloys of the present invention are particularly desirable for continuously cast strip processes. Especially, when such strips are formed with a thickness of less than about 0.06 inches (about 1.5 mm). Thus, the invention provides an improved alloy which can be used to rapidly manufacture thin grids using any manufacturing method. The invention also provides an improved method of manufacturing a grid and a grid having improved durability.

Further, all other references cited in this specification, including without limitation all patents, journal articles, brochures, manuals, periodicals, texts, manuscripts, website publications, and any and all other publications, are hereby incorporated by reference. The discussion of the references herein is intended merely to summarize the assertions made by their authors and no admission is made that any reference constitutes prior art. Applicants reserve the right to challenge the accuracy and pertinence of the cited references.

It is to be understood that the above-description is intended to be illustrative and not restrictive. Many embodiments will be apparent to those of skill in the art upon reading the above-description. The scope of the invention should therefore be determined not with reference to the above-description alone, but should be determined with reference to the claims and the full scope of equivalents to which such claims are entitled.

When introducing elements of the present invention or an embodiment thereof, the articles "a", "an", "the" and "said" are intended to mean that there are one or more of the elements. The terms "comprising", "including" and "having" are intended to be inclusive and mean that there may be additional elements other than the listed elements. Additionally, it is to be understood an embodiment that "consists essentially of" or "consists of" specified constituents may also contain reaction products of said constituents.

The recitation of numerical ranges by endpoints includes all numbers subsumed within that range. For example, a range described as being between 1 and 5 includes 1, 1.6, 2, 2.8, 3, 3.2, 4, 4.75, and 5.

What is claimed is:

1. A battery grid comprising a lead-based alloy comprising lead, tin at a concentration that is at least about 0.500 wt %, silver at a concentration that is greater than 0.006 wt %, and bismuth at a concentration that is at least about 0.005 wt %, and, if calcium is present in the lead-based alloy, the calcium is at concentration that is less than 0.010 wt %, and, if other elements are present in the lead-based alloy, the other elements are at a total concentration of no greater than about 0.010 wt %.

2. The battery grid of claim of 1 wherein the lead-based alloy is essentially free of calcium.

3. The battery grid of claim of 1 wherein the lead-based alloy consists essentially of lead, tin, silver, and bismuth.

4. The battery grid of claim 1 wherein the tin is at a concentration that is no greater than about 2.000 wt %, the silver is at a concentration that is no greater than about 0.050 wt %, and the bismuth is at a concentration that is no greater than about 0.050 wt %.

5. The battery grid of claim 1 wherein the battery grid consists essentially of the lead-based alloy.

6. The battery grid of claim 1 wherein the lead-based alloy is continuously cast.

7. The battery grid of claim 1 wherein the tin is at a concentration that is at least about 0.900 wt % and no greater than about 1.100 wt %, the silver is at a concentration that is at least about 0.018 wt % and no greater than 0.022 wt %, and the bismuth is at a concentration that is at least about 0.015 wt % and no greater than about 0.020 wt %.

8. A battery grid comprising a lead-based alloy comprising lead at a concentration that is at least 98.000 wt %, tin at a concentration that is at least about 0.500 wt %, silver at a concentration that is greater than 0.006 wt %, and bismuth at a concentration that is at least about 0.005 wt %, and, if calcium is present in the lead-based alloy, the calcium is at concentration that is less than 0.010 wt %, and, if other elements are present in the lead-based alloy, the other elements are at a total concentration of no greater than about 0.010 wt %.

9. The battery grid of claim 8 wherein the tin is at a concentration that is at least about 0.700 wt % and no greater than about 1.500 wt %, the silver is at a concentration that is at least about 0.010 wt % and no greater than about 0.030 wt %, and the bismuth is at a concentration that is at least about 0.010 wt % and no greater than about 0.030 wt %.

10. The battery grid of claim 9 wherein the tin is at a concentration that is at least about 0.900 wt % and no greater than about 1.200 wt %, the concentration of silver is at least about 0.015 wt % and no greater than about 0.025 wt %, and the concentration of bismuth is at least about 0.015 wt % and no greater than about 0.025 wt %.

11. A lead-acid battery comprising a container and, within the container, at least one positive plate, at least one negative plate, and at least one separator separating each positive and negative plates, wherein the positive plate comprises a battery grid having a surface and an active material adhered to at least a portion of the battery grid surface, wherein the battery grid comprises a lead-based alloy that comprises lead, tin at a concentration that is at least about 0.500 wt %, silver at a concentration that is greater than 0.006 wt %, and bismuth at a concentration that is at least about 0.005 wt %, and, if calcium is present in the lead-based alloy, the calcium is at concentration that is less than 0.010 wt %, and, if other elements are present in the lead-based alloy, the other elements are at a total concentration of no greater than about 0.010 wt %.

12. The lead-acid battery of claim 11 wherein the lead-based alloy is essentially free of calcium.

13. The lead-acid battery of claim 11 wherein the lead-based alloy consists essentially of lead, tin, silver, and bismuth.

14. The lead-acid battery of claim 11 wherein the tin is at a concentration that is no greater than about 2.000 wt %, the silver is at a concentration that is greater than about 0.050 wt %, and the bismuth is at a concentration that is no greater than about 0.050 wt %.

15. The lead-acid battery of claim 11 wherein the battery grid consists essentially of the lead-based alloy.

16. The lead-acid battery of claim 11 wherein the lead-based alloy is continuously cast.

17. The lead-acid battery of claim 11 wherein the tin is at a concentration that is at least about 0.900 wt % and no greater than about 1.100 wt %, the silver is at a concentration that is at least about 0.018 wt % and no greater than 0.022 wt %, and the bismuth is at a concentration that is at least about 0.015 wt % and no greater than about 0.020 wt %.

18. A lead-acid battery comprising a container and, within the container, at least one positive plate, at least one negative plate, and at least one separator separating each positive and negative plates, wherein the positive plate comprises a battery grid having a surface and an active material adhered to at least a portion of the battery grid surface, wherein the battery grid comprises a lead-based alloy that comprises lead at a concentration that is at least 98.000 wt %, tin at a concentration that is at least about 0.500 wt %, silver at a concentration that is greater than 0.006 wt %, and bismuth at a concentration that is at least about 0.005 wt %, and, if calcium is present in the lead-based alloy, the calcium is at concentration that is no less than 0.010 wt %, and, if other elements are present in the lead-based alloy, the other elements are at a total concentration of no greater than about 0.010 wt %.

19. The lead-acid battery of claim 18 wherein the tin is at a concentration that is at least about 0.700 wt % and no greater than about 1.500 wt %, the silver is at a concentration that is at least about 0.010 wt % and no greater than about 0.030 wt%, and the bismuth is at a concentration that is at least about 0.010 wt % and no greater than about 0.030 wt %.

20. The lead-acid battery of claim 19 wherein the tin is at a concentration that is at least about 0.900 wt % and no greater than about 1.200 wt %, the concentration of silver is at least about 0.015 wt % and no greater than about 0.025 wt %, and the concentration of bismuth is at least about 0.015 wt % and no greater than about 0.025 wt %.

* * * * *